(12) United States Patent
Sugitani et al.

(10) Patent No.: US 8,553,825 B2
(45) Date of Patent: Oct. 8, 2013

(54) PHASE SYNCHRONIZATION APPARATUS AND DIGITAL COHERENT LIGHT RECEIVER

(75) Inventors: Kiichi Sugitani, Fukuoka (JP); Kazunari Shiota, Fukuoka (JP); Yuji Ishii, Fukuoka (JP); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 897 days.

(21) Appl. No.: 12/708,859

(22) Filed: Feb. 19, 2010

(65) Prior Publication Data

US 2010/0239269 A1 Sep. 23, 2010

(30) Foreign Application Priority Data

Mar. 18, 2009 (JP) ................................. 2009-066914

(51) Int. Cl.
*H04L 7/00* (2006.01)
(52) U.S. Cl.
USPC .......................................................... 375/354
(58) Field of Classification Search
USPC .......... 375/354, 329, 340, 355, 359; 455/427; 398/208
See application file for complete search history.

(56) References Cited

U.S. PATENT DOCUMENTS

| | | | |
|---|---|---|---|
| 2003/0107508 A1 | 6/2003 | Koyanagi | |
| 2007/0197210 A1* | 8/2007 | Mosley et al. | 455/427 |
| 2008/0205905 A1 | 8/2008 | Tao et al. | |

FOREIGN PATENT DOCUMENTS

| | | |
|---|---|---|
| JP | 63-187366 | 8/1988 |
| JP | 1-313770 | 12/1989 |
| JP | 2002-271204 | 9/2002 |
| JP | 2003-204248 | 7/2003 |
| JP | 2008-211801 | 9/2008 |

OTHER PUBLICATIONS

Dany-Sebastien Ly-Gagnon, Satoshi Tsukamoto, Kazuhiro Katoh, and Kazuro Kikuchi, Member, IEEE, Member, OSA, "Coherent Detection of Optical Quadrature Phase-Shift Keying Signals With Carrier Phase Estimation", Journal of Lightwave Technology, vol. 24, No. 1, Jan. 2006, pp. 12-21.
Japanese Office Action issued Mar. 26, 2013 for Japanese Application No. 2009-066914.

* cited by examiner

*Primary Examiner* — Khai Tran
(74) *Attorney, Agent, or Firm* — Staas & Halsey LLP

(57) ABSTRACT

A phase synchronization method uses a removal path for removing an error component contained in an input signal and a delay addition path for adding a delay corresponding to a processing time period taken to remove the error component in the removal path. The removal path includes an averaging section. The averaging section includes a shift register and an obtaining unit. The shift register stores as many data as the maximum number of data to be averaged and successively receives processing data from which the error component has been extracted in the removal path. The obtaining unit obtains, among the successive processing data input to the shift register, as many processing data as the number of data to be averaged from a position near the center toward both ends in the shift register.

11 Claims, 14 Drawing Sheets

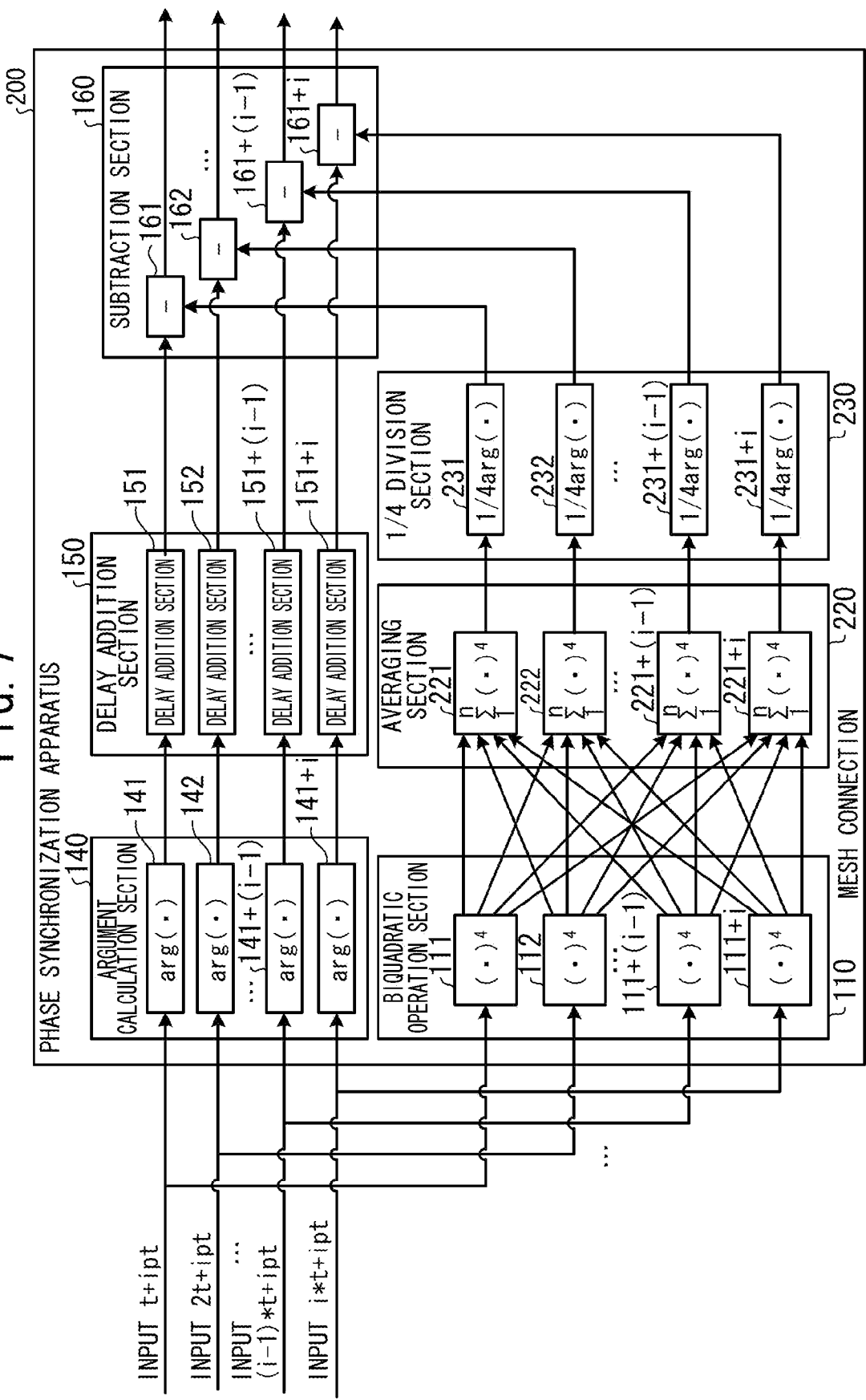

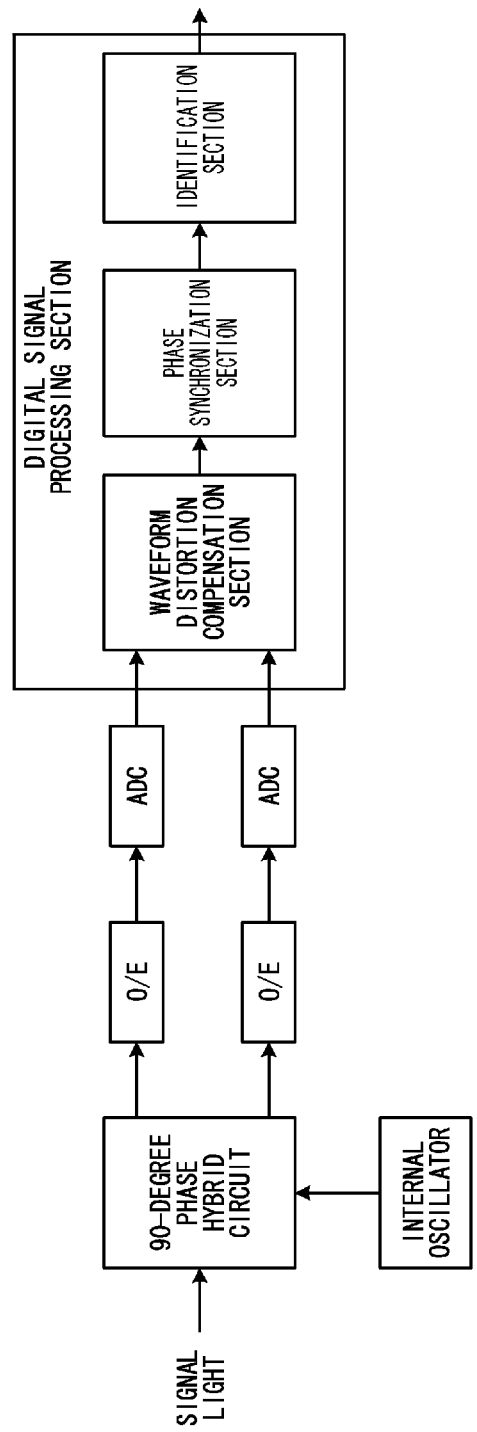

PHASE SYNCHRONIZATION APPARATUS AND DIGITAL COHERENT LIGHT RECEIVER

CROSS-REFERENCE TO RELATED APPLICATIONS

This application is based upon and claims the benefit of priority of the prior Japanese Patent Application No. 2009-66914, filed on Mar. 18, 2009, the entire contents of which are incorporated herein by reference.

BACKGROUND

1. Field

The embodiment discussed herein is related to a phase synchronization apparatus and a digital coherent light receiver.

2. Description of the Related Art

In recent years, attention has been given to a digital coherent light reception method achieved by combining a coherent light reception method and a digital signal processing technique as a next-generation optical communication technique. Techniques relating to the digital coherent light reception method have been disclosed in JP-A-63-187366 and Dany-Sebastien Ly-Gagnon, Satoshi Tsukamoto, Kazuhiro Katoh, and Kazuro Kikuchi, Member, IEEE, Member, OSA, "Coherent Detection of Optical Quadrature Phase-Shift Keying Signals With Carrier Phase Estimation" (JOURNAL OF LIGHTWAVE TECHNOLOGY, VOL. 24, No. 1, JANUARY 2006, pp. 12-21).

Description is now made of the structure of a digital coherent light receiver according to the related art with reference to FIG. 9. FIG. 9 is a diagram illustrating an example of the structure of a digital coherent light receiver in the related art.

As illustrated in FIG. 9, the digital coherent light receiver has, for example, a 90-degree phase hybrid circuit, an internal oscillator, an 0/E (Optical/Electrical), an ADC (Analog Digital Converter), and a digital signal processing section. The digital signal processing section has, for example, a waveform distortion compensation section, a phase synchronization section, and an identification section.

When signal light is input to such a digital coherent light receiver, the 90-degree phase hybrid circuit mixes the signal light with reference light input thereto from the internal oscillator and converts the mixed light into a signal from which the intensity and the phase information of the signal light can be extracted. Next, the 0/E converts the light signal provided in the conversion by the 90-degree phase hybrid circuit into an electric signal. Then, the ADC converts the electric signal provided in the conversion by the 0/E into a digital signal.

The digital signal processing section processes and demodulates the digital signal while extracting the intensity and the phase information of the light signal from the digital signal provided in the conversion by the ADC. Specifically, the wave distortion compensation section compensates for waveform distortion due to wavelength dispersion in optical fibers, polarization-mode dispersion, polarization fluctuations and the like. Then, the phase synchronization section synchronizes the light signal and local light in terms of the optical frequency and the optical phase and restores the intensity and the phase information of the light signal. The identification section demodulates the signal in accordance with the modulation method based on the intensity and the phase information restored by the phase synchronization section.

The modulation methods which can be implemented in a structure similar to that of the receiver include not only a binary modulation method represented by intensity modulation but also MPSK (Multi-ary Phase Shift Keying) such as QPSK (Quadrature Phase Shift Keying) and QAM (Quadrature Amplitude Modulation), for example.

Next, the structure of the phase synchronization section will be described with reference to FIG. 10. FIG. 10 is a diagram illustrating an example of the structure of a phase synchronizer according to the related art. Among the above-mentioned modulation methods, the use of the QPSK modulation will be described.

As illustrated in FIG. 10, the phase synchronization section has a biquadratic operation section, an averaging section, a ¼ division section, an argument calculation section, a delay addition section, and a subtraction section. Out of a signal component and an error component contained in input data, the phase synchronization section calculates the error component and outputs a signal which is provided by removing the error component.

Specifically, the biquadratic operation section extracts the error component from the signal light. The averaging section sums up successive several data and removes the error component extracted by the biquadratic operation section from the data. Then, the ¼ division section returns the error component quadrupled by the biquadratic operation section to the original error component.

The argument calculation performs conversion from complex number into angle. The delay addition section adjusts the delay between the path in an upper portion of FIG. 10 for calculating the argument of the input signal and the path in a lower portion of FIG. 10 for calculating phase noise. Next, the subtraction section subtracts the error component from the input data and outputs the result.

Since there is a trade-off between the number of averaging in the averaging section and variations in SN (Signal to Noise) and the phase noise of the signal, the number of data to be averaged in the averaging section is preferably variable. Specifically, when the SN is poor, the number of averaging is increased to improve the accuracy of monitoring of the phase noise. On the other hand, when the variation speed of the phase noise is high, the number of averaging is preferably reduced. In addition, since the SN and the phase noise of the signal depend on the transmission distance of the light signal, the number of relays involved in transmission and the like, adjustment is preferably performed accordingly.

In view of the foregoing, various techniques have been disclosed for realizing the averaging section in which the number of data to be averaged is variable.

In the related art described above, however, the delay amount is changed with the change of the number of data to be averaged obtained from the shift register. Specifically, in the abovementioned related art, the data to be referenced is one which is placed at the center of the data to be averaged from the left end of the shift register that corresponds to the input side. Thus, in the related art described above, the delay amount is changed with the change of the number of data to be averaged obtained from the shift register. In other words, when the number of data to be averaged in the averaging section is changed, the delay in the delay addition section needs to be changed. The problems are also found in any of the modulation methods mentioned above.

SUMMARY

According to an aspect of the embodiment, a phase synchronization method includes a removal path for removing an error component contained in an input signal and a delay addition path for adding a delay corresponding to a processing time period taken to remove the error component in the removal path. The removal path includes an averaging section. The averaging section includes a shift register and an obtaining unit. The shift register stores as many data as the maximum number of data to be averaged and successively receives processing data from which the error component has been extracted in the removal path. The obtaining unit obtains, among the successive processing data input to the shift register, as many processing data as the number of data to be averaged from a position near the center toward both ends in the shift register.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 7 is a diagram illustrating an example of the structure of a phase synchronization apparatus with a general-purpose parallel input.

FIG. 9 is a diagram illustrating an example of the structure of a digital coherent light receiver according to the related art.

DETAILED DESCRIPTION OF THE PREFERRED EMBODIMENTS

Figure 1A:
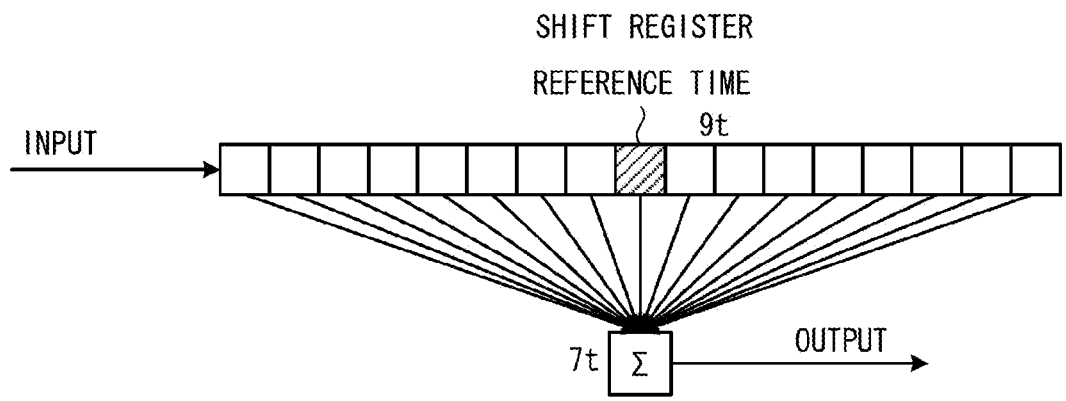
FIG. 1A is a diagram for explaining an example of an averaging circuit when a shift register supports 17 data and the number of data to be averaged is 17 in a serial input.

Reference may now be made in detail to embodiments of the present invention, examples of which are illustrated in the accompanying drawings, wherein like reference numerals refer to like elements throughout.

Embodiments of a phase synchronization apparatus and a digital coherent light receiver will hereinafter be described with reference to the accompanying drawings. The embodiments are not limited to the following.

Embodiment 1

Figure 10:
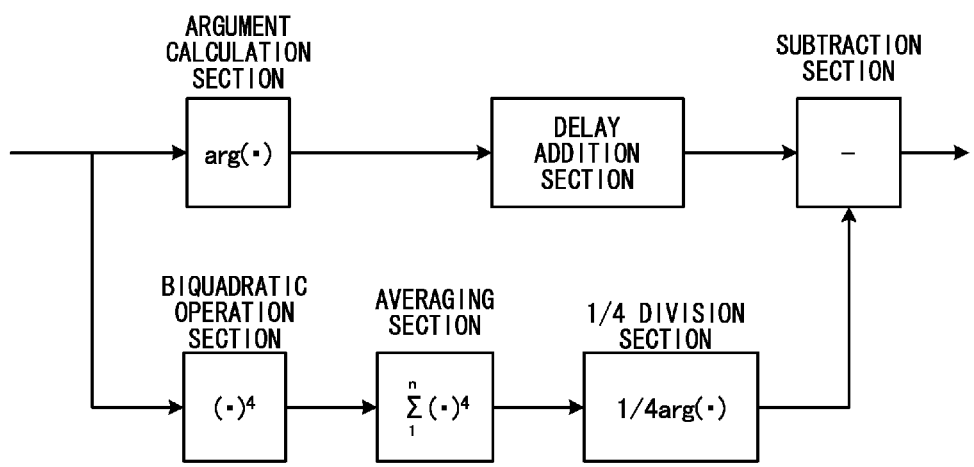
FIG. 10 is a diagram illustrating an example of the structure of a phase synchronizer according to the related art.

The phase synchronization apparatus disclosed in the present application has, for example, a removal path for removing an error component contained in an input signal and a delay addition path for adding a delay corresponding to a processing time period taken to remove the error component with the removal path (see FIG. 10). The phase synchronization apparatus is included in the digital coherent receiver, for example (see FIG. 9).

The phase synchronization apparatus has a shift register supporting as many data as the maximum number of data to be averaged and successively receiving, as its input, processing data from which the error component has been extracted in the removal path. Among the successive processing data input to the shift register, the phase synchronization apparatus obtains as many processing data as the number of data to be averaged from near the center toward both ends in the shift register.

For example, the shift register included in the phase synchronization apparatus successively receives, as its input, processing data which have been subjected to processing of extracting an error component by the biquadratic operation section (see FIG. 10). The processing data which have been subjected to the extraction processing by the biquadratic operation section is successively input to the shift register, for example, for each unit time t.

Now, description is made of the shift register included in the phase synchronization apparatus and the processing of obtaining the processing data by the phase synchronization apparatus with reference to FIG. 1A to FIG. 4B. FIG. 1A to FIG. 4B illustrate the case where the processing data input to the shift register is a serial input signal.

FIG. 1A to FIG. 2B illustrates the case were the maximum number of data to be averaged is 17, that is, when the shift register supports an odd number of data and allows 17 as the number of data to be averaged. FIG. 3A to FIG. 4B illustrates the case were the maximum number of data to be averaged is 18, that is, when the shift register supports an even number of data and allows 18 as the number of data to be averaged.

[Serial Input]

First, an averaging circuit will be described in which the number of data to be averaged is 17 with reference to FIG. 1A. FIG. 1A is a diagram for explaining an example of the averaging circuit when the shift register supports 17 data and the number of data to be averaged is 17 in the serial input.

For example, among successive processing data input to the shift register, the phase synchronization apparatus obtains 17 processing data corresponding to the number of data to be averaged from the center or reference time 9 t toward both ends in the shift register. Then, the phase synchronization apparatus sums up the obtained 17 data and outputs the result. The processing time period taken for summing up the processing data is 7 t.

When the number of data to be averaged is 17 as described above, the time referenced by the subtraction section (see FIG. 10) in a later stage is 9 t. In brief, the delay amount added by the delay addition section (see FIG. 10) is 16 t determined by summing the processing delay 9 t in the shift register and the processing delay 7 t in the summation section.

Figure 1B:
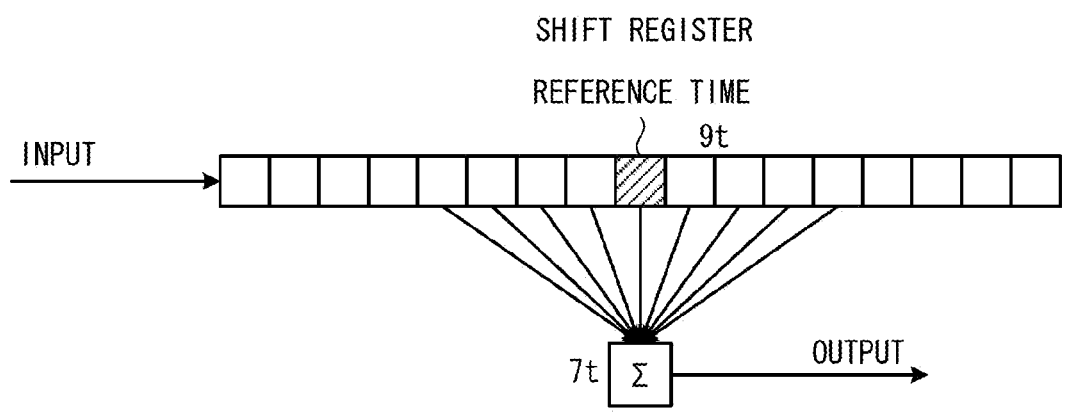
FIG. 1B is a diagram for explaining an example of the averaging circuit when the shift register supports 17 data and the number of data to be averaged is 9 in the serial input.
Figure 1C:
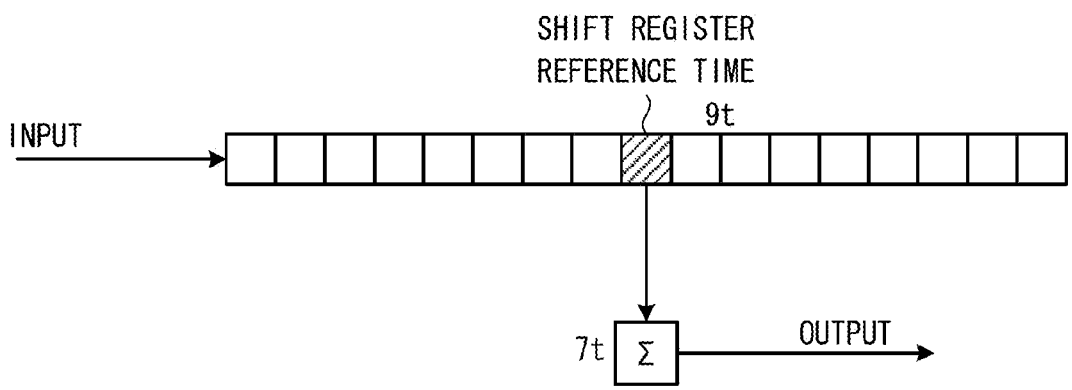
FIG. 1C is a diagram for explaining an example of the averaging circuit when the shift register supports 17 data and the number of data to be averaged is 1 in the serial input.

Next, an averaging circuit will be described in which the number of data to be averaged is 9 with reference to FIG. 1B. FIG. 1B is a diagram for explaining an example of the averaging circuit when the shift register supports 17 data and the number of data to be averaged is 9 in the serial input.

For example, among successive processing data input to the shift register, the phase synchronization apparatus obtains 9 processing data corresponding to the number of data to be averaged from the center or reference time 9 t toward both ends in the shift register. Then, the phase synchronization apparatus sums up the obtained 9 data and outputs the result. The processing time period taken for summing up the processing data is 7 t.

When the number of data to be averaged is 9 as described above, the time referenced by the subtraction section in the later stage is 9 t. In brief, the delay amount added by the delay addition section is 16 t determined by summing the processing delay 9 t in the shift register and the processing delay 7 t in the summation section.

Next, an averaging circuit will be described in which the number of data to be averaged is 1 with reference to FIG. 10. FIG. 10 is a diagram for explaining an example of the averaging circuit when the shift register supports 17 data and the number of data to be averaged is 1 in the serial input.

For example, among successive processing data input to the shift register, the phase synchronization apparatus obtains one processing data corresponding to the number of data to be averaged, that is, one processing data at 9 t, from the center or reference time 9 t toward both ends in the shift register. Then, the phase synchronization apparatus sums up the obtained one processing data and outputs the result. The processing time period taken for summing up the processing data is 7 t.

When the number of data to be averaged is 1 as described above, the time referenced by the subtraction section in the later stage is 9 t. In brief, the delay amount added by the delay addition section is 16 t determined by summing the processing delay 9 t in the shift register and the processing delay 7 t in the summation section.

As described above, the phase synchronization apparatus obtains the processing data corresponding to the number of data to be averaged uniformly from the center toward both ends in the shift register when the maximum number of data to be averaged is an odd number and the number of data to be averaged is an odd number.

Figure 2A:
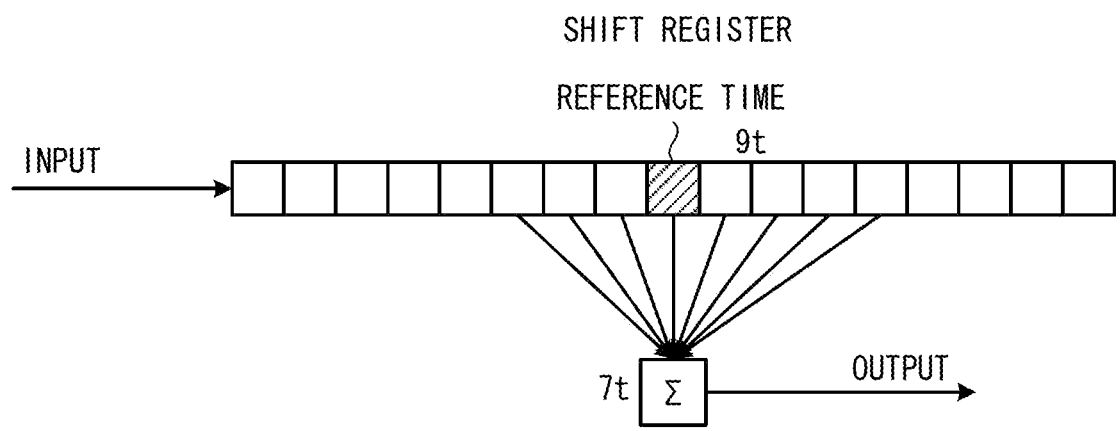
FIG. 2A is a diagram for explaining an example of the averaging circuit when the shift register supports 17 data and the number of data to be averaged is 8 in the serial input.
Figure 2B:
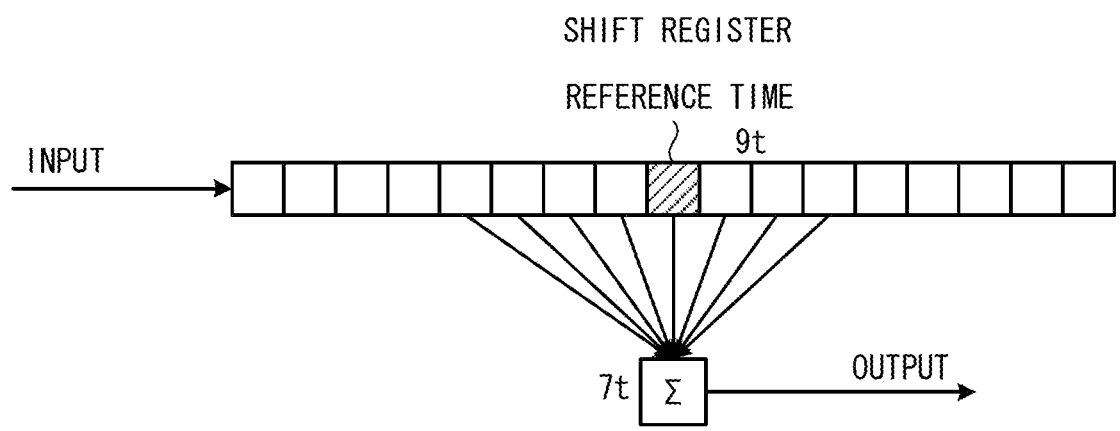
FIG. 2B is a diagram for explaining an example of the averaging circuit when the shift register supports 17 data and the number of data to be averaged is 8 in the serial input.

Next, an averaging circuit will be described in which the number of data to be averaged is 8 with reference to FIGS. 2A and 2B. FIGS. 2A and 2B are diagrams for explaining an example of the averaging circuit when the shift register supports 17 data and the number of data to be averaged is 8 in the serial input.

For example, as illustrated in FIG. 2A, among successive processing data input to the shift register, the phase synchronization apparatus obtains 8 processing data corresponding to the number of data to be averaged from the center or reference time 9 t toward both ends in the shift register such that the number of the processing data after 9 t is larger by one.

As illustrated in FIG. 2B, among successive processing data input to the shift register, the phase synchronization apparatus obtains 8 processing data corresponding to the number of data to be averaged from the center or reference time 9 t toward both ends in the shift register such that the number of the processing data before 9 t is larger by one.

Then, the phase synchronization apparatus sums up the obtained 8 processing data and outputs the result. The processing time period taken for summing up the processing data is 7 t.

When the number of data to be averaged is 8 as described above, the time referenced by the subtraction section in a later stage is 9 t. In brief, the delay amount added by the delay addition section is 16 t determined by summing the processing delay 9 t in the shift register and the processing delay 7 t in the summation section.

When the number of data to be averaged is an even number, the center of the obtained processing data is not coincident with the reference time, so that an ideal position cannot be set at the reference time. When the ideal position cannot be set at the reference time, however, the averaging circuit as illustrated in FIGS. 2A and 2B may be used since it is only necessary to calculate the average at such a level as to allow recovery of signals by the identification section (see FIG. 9) in a later stage of the phase synchronization apparatus.

As described above, the phase synchronization apparatus obtains as many processing data as the number of data to be averaged uniformly from the center toward both ends in the shift register such that the number of the processing data before or after the center is larger by one when the maximum number of data to be averaged is an odd number and the number of data to be averaged is an even number.

Figure 3A:
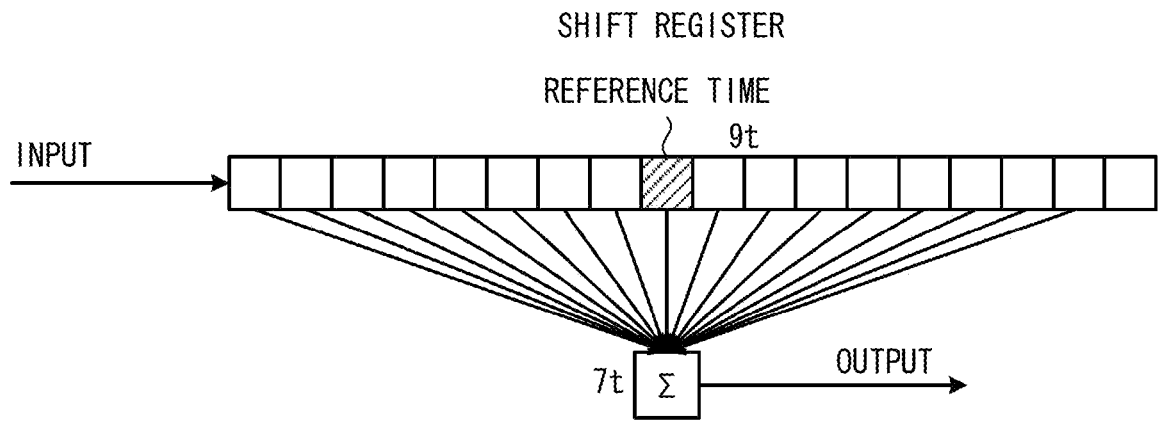
FIG. 3A is a diagram for explaining an example of the averaging circuit when the shift register supports 18 data and the number of data to be averaged is 17 in the serial input.

Next, an averaging circuit will be described in which the number of data to be averaged is 17 with reference to FIG. 3A. FIG. 3A is a diagram for explaining an example of the averaging circuit when the shift register supports 18 data and the number of data to be averaged is 17 in the serial input.

For example, among successive processing data input to the shift register, the phase synchronization apparatus obtains 17 processing data corresponding to the number of data to be averaged from reference time 9 t or reference time 10 t near the center toward both ends in the shift register. Description is made herein assuming that reference time 9 t is used as the position near the center in the shift register. Then, the phase synchronization apparatus sums up the obtained 17 processing data and outputs the result. The processing time period taken for summing up the processing data is 7 t.

When the number of data to be averaged is 17 as described above, the time referenced by the subtraction section in a later stage is 9 t. In brief, the delay amount added by the delay addition section is 16 t determined by summing the processing delay 9 t in the shift register and the processing delay 7 t in the summation section.

Figure 3B:
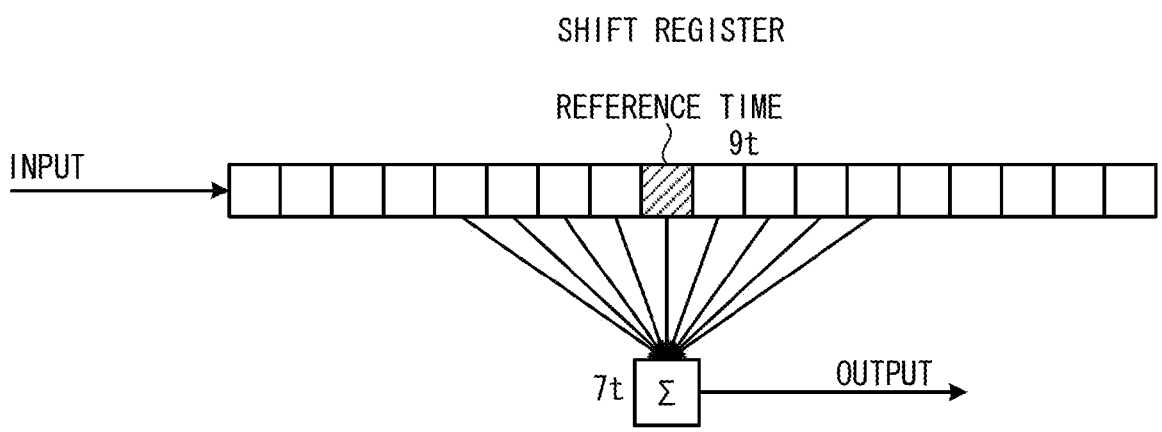
FIG. 3B is a diagram for explaining an example of the averaging circuit when the shift register supports 18 data and the number of data to be averaged is 9 in the serial input.

Next, an averaging circuit will be described in which the number of data to be averaged is 9 with reference to FIG. 3B. FIG. 3B is a diagram for explaining an example of the averaging circuit when the shift register supports 18 data and the number of data to be averaged is 9 in the serial input.

For example, among successive processing data input to the shift register, the phase synchronization apparatus obtains 9 processing data corresponding to the number of data to be averaged from reference time 9 t or reference time 10 t near the center toward both ends in the shift register. Description is made herein assuming that reference time 9 t is used as the position near the center in the shift register. Then, the phase synchronization apparatus sums up the obtained 9 processing data and outputs the result. The processing time period taken for summing up the processing data is 7 t.

When the number of data to be averaged is 9 as described above, the time referenced by the subtraction section in the later stage is 9 t. In brief, the delay amount added by the delay addition section is 16 t determined by summing the processing delay 9 t in the shift register and the processing delay 7 t in the summation section.

Figure 3C:
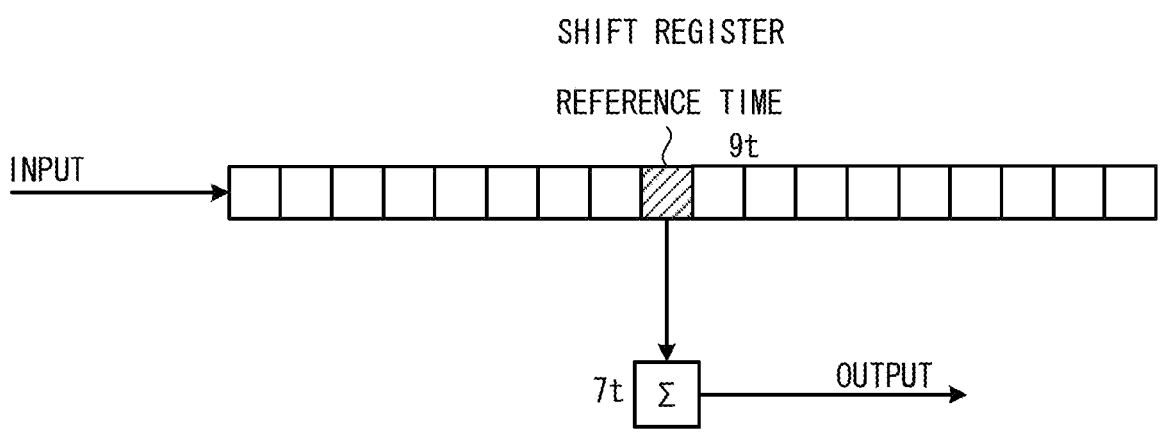
FIG. 3C is a diagram for explaining an example of the averaging circuit when the shift register supports 18 data and the number of data to be averaged is 1 in the serial input.

Next, an averaging circuit will be described in which the number of data to be averaged is 1 with reference to FIG. 3C. FIG. 3C is a diagram for explaining an example of the averaging circuit when the shift register supports 18 data and the number of data to be averaged is 1 in the serial input.

For example, among successive processing data input to the shift register, the phase synchronization apparatus obtains one processing data corresponding to the number of data to be averaged, that is, one processing data at 9 t or 10 t, from reference time 9 t or reference time 10 t near the center toward both ends in the shift register. Description is made herein assuming that reference time 9 t is used as the position near the center in the shift register. Then, the phase synchronization apparatus sums up the obtained one processing data and outputs the result. The processing time period taken for summing up the processing data is 7 t.

When the number of data to be averaged is 1 as described above, the time referenced by the subtraction section in the later stage is 9 t. In brief, the delay amount added by the delay addition section is 16 t determined by summing the processing delay 9 t in the shift register and the processing delay 7 t in the summation section.

When the maximum number of data to be averaged is an even number, the center is not present in the shift register, so that one of the two positions near the center is used as the reference time. Which one of the two positions near the center in the shift register is used as the reference time may be previously set. Even when the reference time varies, the averaging circuit as illustrated in FIGS. 3A to 3C may be used since it is only necessary to calculate the average at such a level as to allow recovery of signals by the identification section in a later stage of the phase synchronization apparatus.

As described above, the phase synchronization apparatus obtains as many processing data as the number of data to be averaged uniformly from one of the two positions near the center toward both ends in the shift register when the maximum number of data to be averaged is an even number and the number of data to be averaged is an odd number.

Figure 4A:
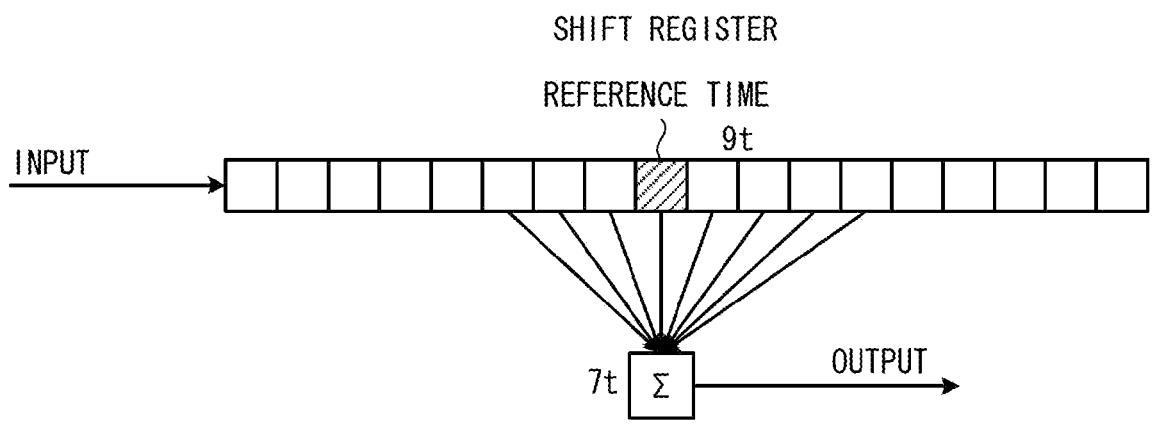
FIG. 4A is a diagram for explaining an example of the averaging circuit when the shift register supports 18 data and the number of data to be averaged is 8 in the serial input.
Figure 4B:
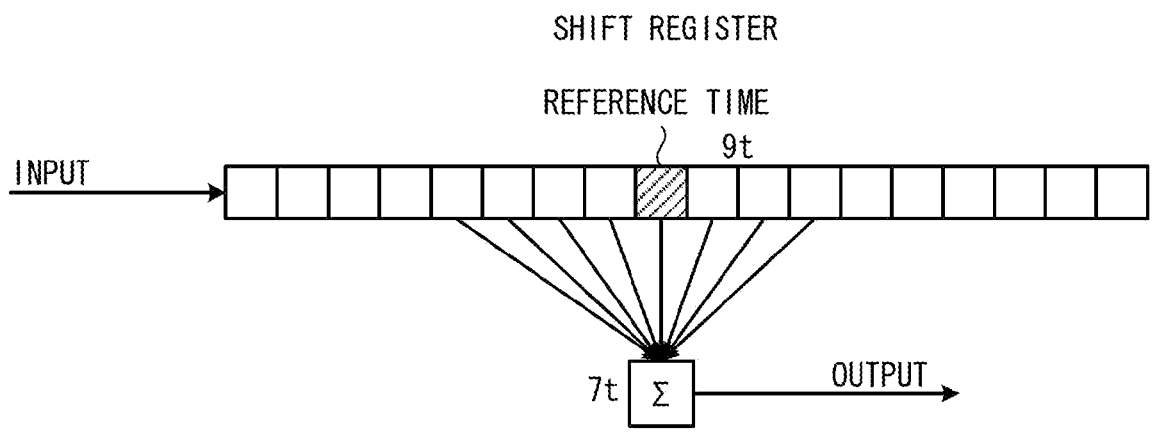
FIG. 4B is a diagram for explaining an example of the averaging circuit when the shift register supports 18 data and the number of data to be averaged is 8 in the serial input.

Next, an averaging circuit will be described in which the number of data to be averaged is 8 with reference to FIGS. 4A and 4B. FIGS. 4A and 4B are diagrams for explaining an example of the averaging circuit when the shift register supports 18 data and the number of data to be averaged is 8 in the serial input.

For example, as illustrated in FIG. 4A, among successive processing data input to the shift register, the phase synchronization apparatus obtains 8 processing data corresponding to the number of data to be averaged from reference time 9 t near the center toward both ends in the shift register such that the number of the processing data after 9 t is larger by one. When reference time 10 t is used as the position near the center in the shift register, the phase synchronization apparatus may obtain, among successive processing data input to the shift register, 8 processing data corresponding to the number of data to be averaged from reference time 10 t near the center toward both ends in the shift register such that the number of the processing data before 10 t is larger by one.

In other words, when the number of data to be averaged is an even number, the maximum number of data to be averaged is an even number, and the number of data to be averaged is equal to the maximum number of data to be averaged, then the phase synchronization apparatus obtains the processing data such that the number of the data before or after the center is larger by one depending on the set position near the center in order to obtain all the processing data. For example, when the number of data to be averaged is 10 and the maximum number of data to be averaged is 10, the phase synchronization apparatus obtains the processing data such that the number of the data after 4 t is larger by one when 4 t is used as the position near the center or such that the number of the data before 5 t is larger by one when 5 t is used as the position near the center in order to obtain the 10 processing data. When the number of data to be averaged is not equal to the maximum number of data to be averaged, the phase synchronization apparatus may obtain the processing data such that the number of the data before or after the set position near the center is larger by one.

Specifically, as illustrated in FIG. 4B, among successive processing data input to the shift register, the phase synchronization apparatus obtains 8 processing data corresponding to the number of data to be averaged from reference time 9 t or reference time 10 t near the center toward both ends in the shift register such that the number of the processing data before 9 t or 10 t is larger by one. Description is made herein assuming that reference time 9 t is used as the position near the center in the shift register.

Then, the phase synchronization apparatus sums up the obtained 8 processing data and outputs the result. The processing time period taken for summing up the processing data is 7 t.

When the number of data to be averaged is 8 as described above, the time referenced by the subtraction section in a later stage is 9 t. In brief, the delay amount added by the delay addition section is 16 t determined by summing the processing delay 9 t in the shift register and the processing delay 7 t in the summation section.

When the maximum number of data to be averaged is an even number, the center is not present in the shift register, so that one of the two positions near the center is used as the reference time. Which one of the two positions near the center in the shift register is used as the reference time may be previously set.

When the number of data to be averaged is an even number, the center of the obtained processing data is not coincident with the reference time, so that an ideal position cannot be set at the reference time. When the reference time varies and when the ideal position cannot be set at the reference time, however, the averaging circuit as illustrated in FIGS. 4A and 4B may be used since it is only necessary to calculate the average at such a level as to allow recovery of signals by the identification section in a later stage of the phase synchronization apparatus.

As described above, when the maximum number of data to be averaged is an even number and the number of data to be averaged is an even number, the phase synchronization apparatus obtains as many processing data as the number of data to be averaged from one of the two positions near the center toward both ends in the shift register such that the number of the processing data before or after that position is larger by one.

Thus, since the phase synchronization apparatus obtains and sums up as many processing data as the number of data to be averaged from near the center toward both ends in the shift register, it is possible to obtain a variable number of data to be averaged from the shift register and to achieve an invariable delay amount. In other words, the phase synchronization apparatus allows a variable number of data to be averaged and requires no change in the delay amount as compared with the related art which requires changes in delay amount associated with changes in the number of data to be averaged. This can prevent main signal errors produced in changing the delay amount.

While the description has been made in conjunction with the processing of the serial input by the phase synchronization apparatus, the phase synchronization apparatus disclosed in the present application may support the case the processing data input to the shift register is a parallel input signal.

Description is now made of the case where the processing data input to the shift register is a parallel input signal with reference to FIGS. 5 to 8C. In the following, description will be made of the case where the input to the phase synchronization apparatus is a fixed parallel input with reference to FIGS. 5 to 6F and the case where the input to the phase synchronization apparatus is a general-purpose parallel input with reference to FIGS. 7 to 8D.

[4-Parallel Input]

Figure 5:
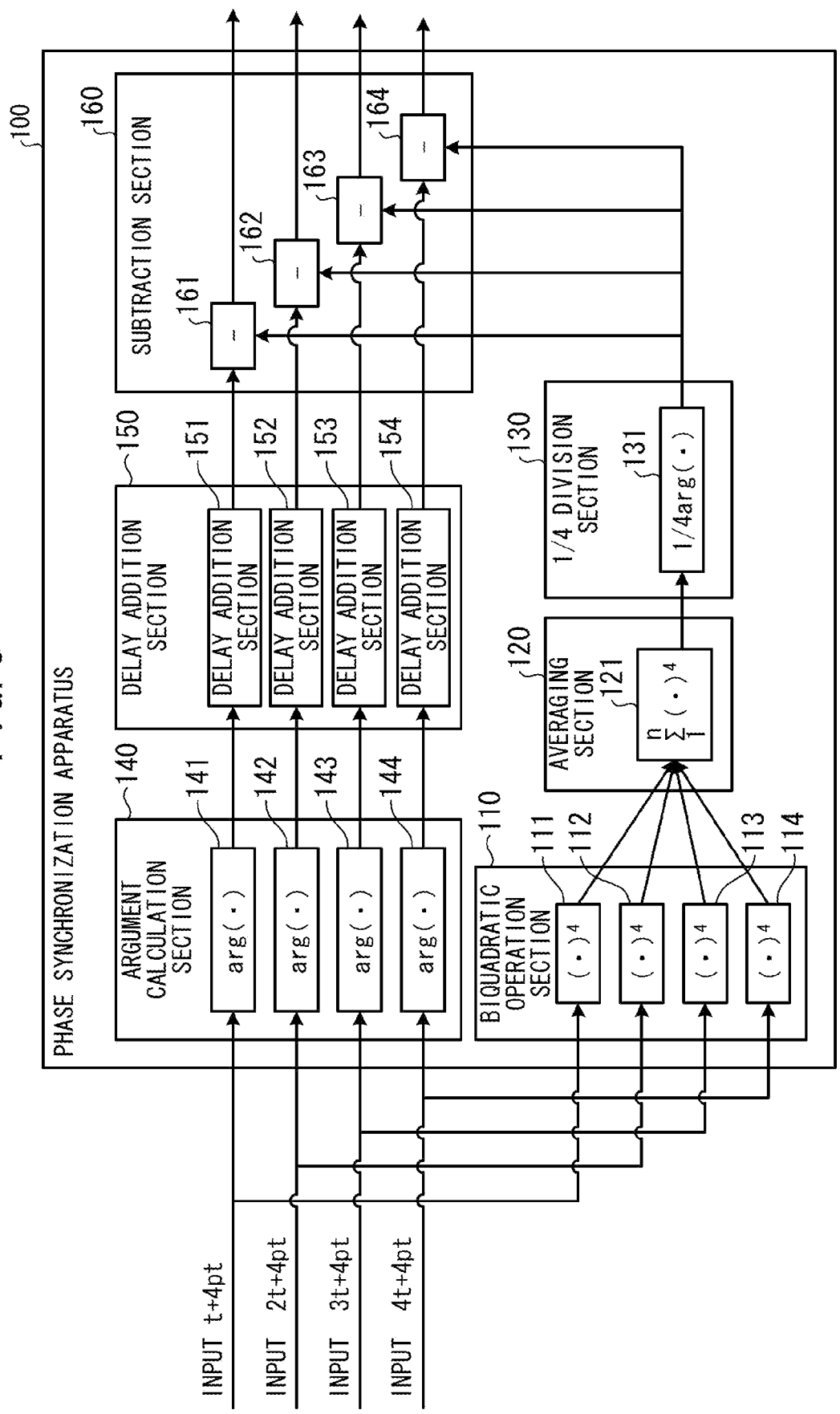
FIG. 5 is a diagram illustrating an example of the structure of a phase synchronization apparatus with a 4-parallel input.

First, the structure of a phase synchronization apparatus with a 4-parallel input will be described as an example of the fixed parallel input with reference to FIG. 5. FIG. 5 is a diagram illustrating an example of the structure of a phase synchronization apparatus with the 4-parallel input.

For example, as illustrated in FIG. 5, the phase synchronization apparatus 100 has a biquadratic operation section 110, an averaging section 120, a ¼ division section 130, an argument calculation section 140, a delay addition section 150, and a subtraction section 160. The phase synchronization apparatus 100 receives, as its input, four temporally successive data such as t+4 pt (p: 0, 1, 2, . . . ), 2 t+4 pt, 3 t+4 pt, and 4 t+4 pt when the unit time is represented by t. For example, four data input at the initial time are t, 2 t, 3 t, and 4 t, and four data input at the next time are 5 t, 6 t, 7 t, and 8 t.

The biquadratic operation section 110 has four biquadratic operation sections including biquadratic operation sections 111 to 114. The averaging section 120 has an averaging section 121, and the ¼ division section 130 has a ¼ division section 131. The ¼ division section includes one argument calculation section. The argument calculation section 140 has four argument calculation sections including argument calculation sections 141 to 144. The delay addition section 150 has four delay addition sections including delay addition sections 151 to 154. The subtraction section 160 has four subtraction sections including subtraction sections 161 to 164.

Since some of the functions and the processing provided by each processing section included in the phase synchronization apparatus 100 are similar to those in the phase synchronization apparatus illustrated in FIG. 10, the description thereof is omitted, and the processing by the averaging section 121 will hereinafter be described with reference to FIGS. 6A to 6F. FIGS. 6A to 6F illustrate the case where the maximum number of data to be averaged is 20, that is, when the shift register can support 20 data to be averaged.

In FIGS. 6A to 6F, the reference time is set at the central columns in a 5-by-4 data shift register. Specifically, the reference time is set at the latest time in the central columns, that is, time 12 t at the lowermost position of the central columns. A plurality of reference times are provided in this manner for outputting four data corresponding to four data input to the phase synchronization apparatus 100 due to the parallel input. When the number of data to be averaged is three or smaller, 12 t may be used as the center.

Figure 6A:
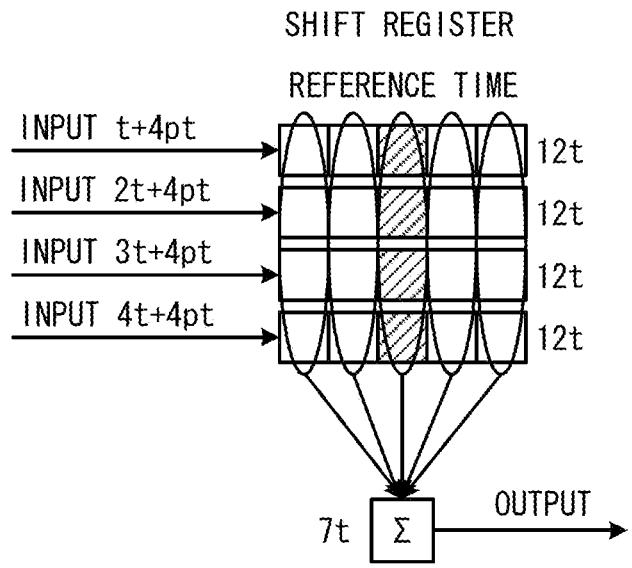
FIG. 6A is a diagram for explaining an example of the averaging circuit when the shift register supports 20 data and the number of data to be averaged is 20 in the 4-parallel input.

First, an averaging circuit will be described in which the number of data to be averaged is 20 with reference to FIG. 6A. FIG. 6A is a diagram for explaining an example of the averaging circuit when the shift register supports 20 data and the number of data to be averaged is 20 in the 4-parallel input.

For example, as illustrated in FIG. 6A, among successive processing data input to the shift register, the phase synchronization apparatus 100 obtains 20 processing data corresponding to the number of data to be averaged from reference time 12 t near the center toward both ends in the shift register. Then, the phase synchronization apparatus 100 sums up the obtained 20 processing data and outputs the result. The processing time period taken for summing up the processing data is 7 t.

When the number of data to be averaged is 20 as described above, the time referenced by the subtraction sections 161 to 164 in the later stage is 12 t. In brief, the delay amount added by the delay addition sections 151 to 154 is 19 t determined by summing the processing delay 12 t in the shift register and the processing delay 7 t in the summation section.

Figure 6B:
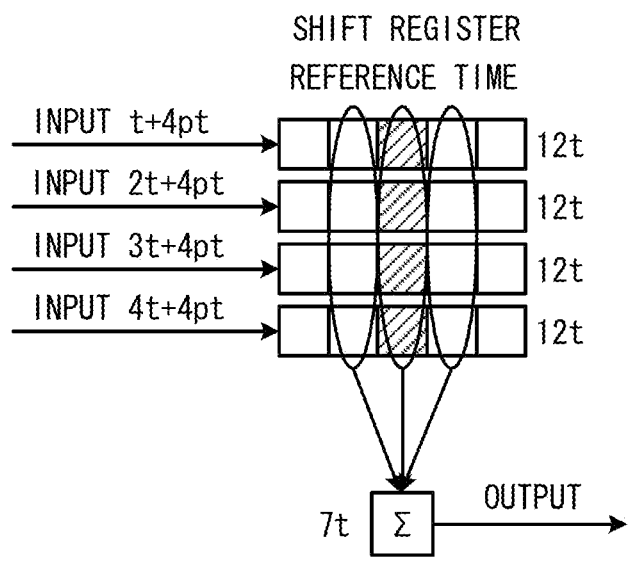
FIG. 6B is a diagram for explaining an example of the averaging circuit when the shift register supports 20 data and the number of data to be averaged is 12 in the 4-parallel input.

Next, an averaging circuit will be described in which the number of data to be averaged is 12 with reference to FIG. 6B. FIG. 6B is a diagram for explaining an example of the averaging circuit when the shift register supports 20 data and the number of data to be averaged is 12 in the 4-parallel input.

For example, as illustrated in FIG. 6B, among successive processing data input to the shift register, the phase synchronization apparatus 100 obtains 12 processing data corresponding to the number of data to be averaged from reference time 12 t near the center toward both ends in the shift register. Then, the phase synchronization apparatus 100 sums up the obtained 12 processing data and outputs the result. The processing time period taken for summing up the processing data is 7 t.

When the number of data to be averaged is 12 as described above, the time referenced by the subtraction sections 161 to 164 in the later stage is 12 t. In brief, the delay amount added by the delay addition sections 151 to 154 is 19 t determined by summing the processing delay 12 t in the shift register and the processing delay 7 t in the summation portion.

Figure 6C:
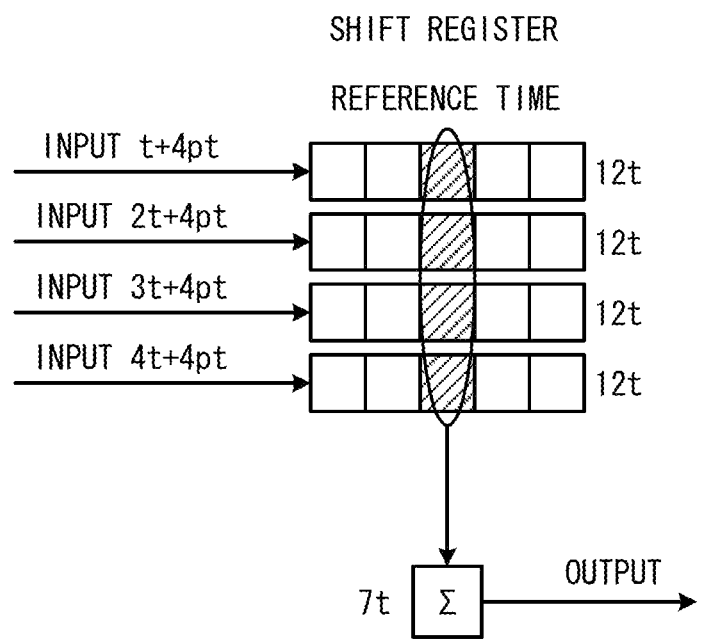
FIG. 6C is a diagram for explaining an example of the averaging circuit when the shift register supports 20 data and the number of data to be averaged is 4 in the 4-parallel input.

Next, an averaging circuit will be described in which the number of data to be averaged is 4 with reference to FIG. 6C. FIG. 6C is a diagram for explaining an example of the averaging circuit when the shift register supports 20 data and the number of data to be averaged is 4 in the 4-parallel input.

For example, as illustrated in FIG. 6C, among successive processing data input to the shift register, the phase synchronization apparatus 100 obtains 4 processing data corresponding to the number of data to be averaged from reference time 12 t near the center toward both ends in the shift register. Then, the phase synchronization apparatus 100 sums up the obtained 4 processing data and outputs the result. The processing time period taken for summing up the processing data is 7 t.

When the number of data to be averaged is 4 as described above, the time referenced by the subtraction sections 161 to 164 in the later stage is 12 t. In brief, the delay amount added by the delay addition sections 151 to 154 is 19 t determined by summing the processing delay 12 t in the shift register and the processing delay 7 t in the summation section.

Figure 6D:
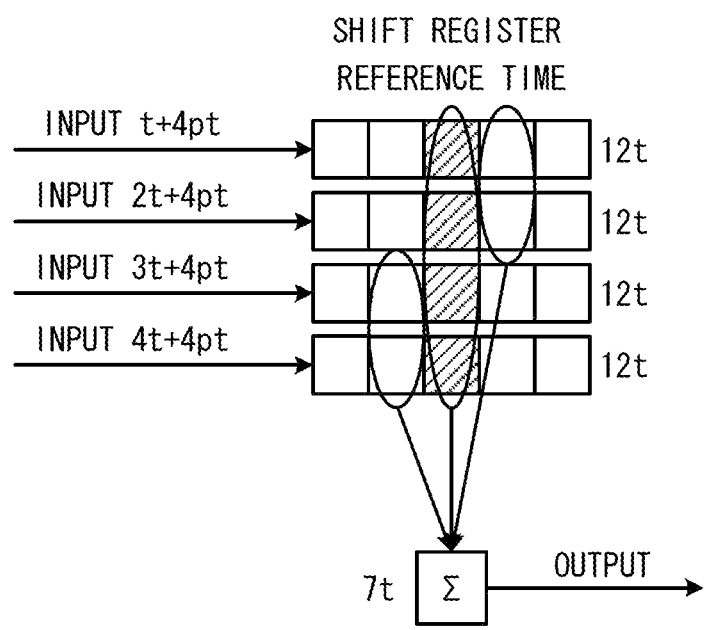
FIG. 6D is a diagram for explaining an example of the averaging circuit when the shift register supports 20 data and the number of data to be averaged is 8 in the 4-parallel input.

Next, an averaging circuit will be described in which the number of data to be averaged is 8 with reference to FIG. 6D. FIG. 6D is a diagram for explaining an example of the averaging circuit when the shift register supports 20 data and the number of data to be averaged is 8 in the 4-parallel input.

For example, as illustrated in FIG. 6D, among successive processing data input to the shift register, the phase synchronization apparatus 100 obtains 8 processing data corresponding to the number of data to be averaged from reference time 12 t near the center toward both ends in the shift register. Then, the phase synchronization apparatus 100 sums up the obtained 8 processing data and outputs the result. The processing time period taken for summing up the processing data is 7 t.

When the number of data to be averaged is 8 as described above, the time referenced by the subtraction sections 161 to 164 in the later stage is 12 t. In brief, the delay amount added by the delay addition sections 151 to 154 is 19 t determined by summing the processing delay 12 t in the shift register and the processing delay 7 t in the summation section.

Figure 6E:
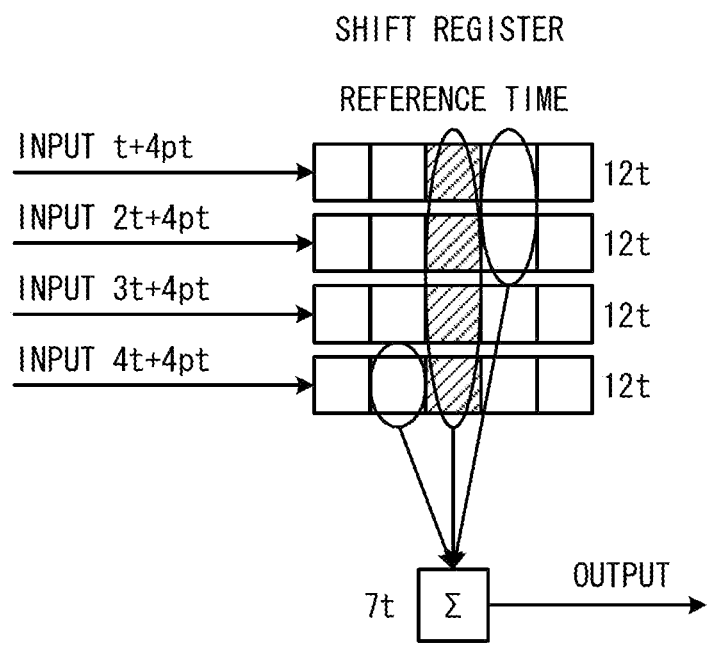
FIG. 6E is a diagram for explaining an example of the averaging circuit when the shift register supports 20 data and the number of data to be averaged is 7 in the 4-parallel input.
Figure 6F:
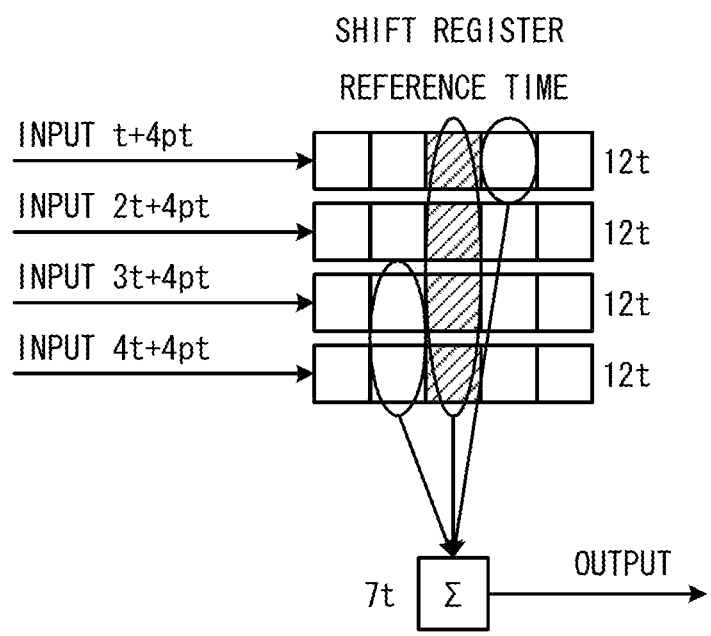
FIG. 6F is a diagram for explaining an example of the averaging circuit when the shift register supports 20 data and the number of data to be averaged is 7 in the 4-parallel input.

Next, an averaging circuit will be described in which the number of data to be averaged is 7 with reference to FIGS. 6E and 6F. FIGS. 6E and 6F are diagrams for explaining an example of the averaging circuit when the shift register supports 20 data and the number of data to be averaged is 7 in the 4-parallel input.

For example, as illustrated in FIG. 6E, among successive processing data input to the shift register, the phase synchronization apparatus 100 obtains 7 processing data corresponding to the number of data to be averaged from reference time 12 t near the center toward both ends in the shift register such that the number of the processing data after 12 t is larger by one.

In addition, for example, as illustrated in FIG. 6F, among successive processing data input to the shift register, the phase synchronization apparatus 100 obtains 7 processing data corresponding to the number of data to be averaged from reference time 12 t near the center toward both ends in the shift register such that the number of the processing data before 12 t is larger by one.

Then, the phase synchronization apparatus 100 sums up the obtained 7 processing data and outputs the result. The processing time period taken for summing up the processing data is 7 t.

When the number of data to be averaged is 7 as described above, the time referenced by the subtraction sections 161 to 164 in the later stage is 12 t. In brief, the delay amount added by the delay addition sections 151 to 154 is 19 t determined by summing the processing delay 12 t in the shift register and the processing delay 7 t in the summation section.

Thus, the phase synchronization apparatus 100 which supports the fixed parallel input can obtain a variable number of data to be averaged from the shift register and achieve an invariable delay amount within the range which can be normally identified by the identification section in the later stage.

[General-Purpose Parallel Input]

Next, the structure of a phase synchronization apparatus with a general-purpose input will be described with reference to FIG. 7. FIG. 7 is a diagram illustrating an example of the structure of a phase synchronization apparatus with the general-purpose input.

For example, as illustrated in FIG. 7, the phase synchronization apparatus 200 has a biquadratic operation section 110, an averaging section 220, a ¼ division section 230, an argument calculation section 140, a delay addition section 150, and a subtraction section 160. The phase synchronization apparatus 200 receives, as its input, temporally successive data such as t+ipt (p: 0, 1, 2, . . . ), 2 t+ipt, . . . , (i−1)×t+ipt, and i×t+ipt when the unit time and the number of input paths are represented by t and i, respectively.

The biquadratic operation section 110 has i biquadratic operation sections including biquadratic operation sections 111 to 111+i. The averaging section 220 has i averaging sections including averaging sections 221 to 221+i. The ¼ division section 230 has i ¼ division sections including ¼ division sections 231 to 231+i. Each of the ¼ division sections includes one argument calculation section.

The argument calculation section 140 has i argument calculation sections including argument calculation sections 141 to 141+i. The delay addition section 150 has i delay addition sections including delay addition sections 151 to 151+i. The subtraction section 160 has i subtraction sections including subtraction sections 161 to 161+i.

The functions similar to those of the phase synchronization apparatus 100 illustrated in FIG. 5 are designated with the same reference numerals in FIG. 7. In the following, the description of the functions similar to those of the phase synchronization apparatus 100 is omitted, and description is made of the processing by the averaging sections 221 to 221+i different from the phase synchronization apparatus 100 with reference to FIGS. 8A to 8D. In detail, the following description focuses on the processing of obtaining an ideal summation operation range when the reference time in a 4-parallel input is set at 9 t in the averaging circuit illustrated in FIGS. 6A to 6F and the like. In FIGS. 8A to 8D, description is also made of the case where the maximum number of data to be averaged is 17, that is, when the shift register can support 17 data to be averaged.

Figure 8A:
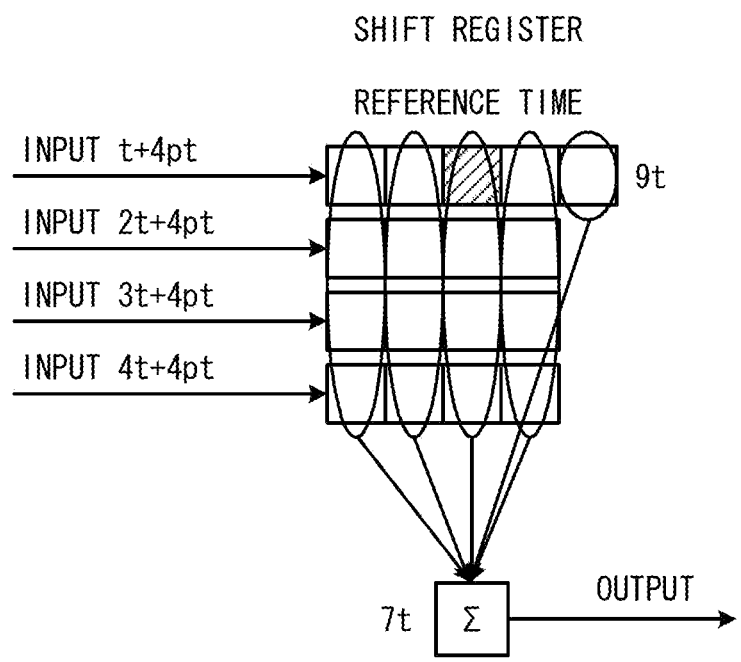
FIG. 8A is a diagram for explaining an example of the averaging circuit when the reference time is set at 9 t in the general-purpose parallel input.

An averaging circuit will be described in which the reference time is set at 9 t with reference to FIG. 8A. FIG. 8A is a diagram for explaining an example of the averaging circuit when the reference time is set at 9 t in the general-purpose parallel input.

As illustrated in FIG. 8A, the phase synchronization apparatus 200 has a shift register in which 8 data can be located from reference time 9 t at the center toward both ends and a circuit for summing up 17 processing data, for example.

Among successive processing data input to the shift register, the phase synchronization apparatus 200 obtains 17 processing data corresponding to the number of data to be averaged from the center or reference time 9 t toward both ends in the shift register.

Then, the phase synchronization apparatus 200 sums up the obtained 17 processing data and outputs the result. The processing time period taken for summing up the processing data is 7 t.

Figure 8B:
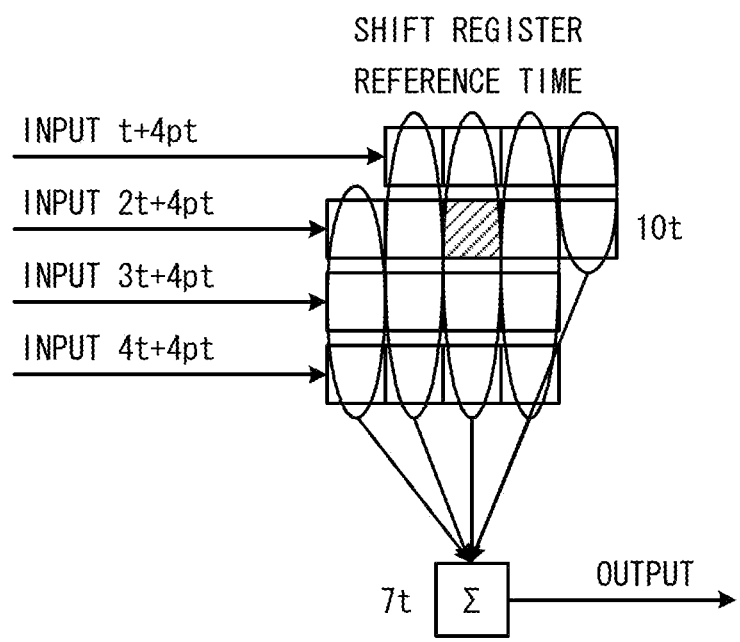
FIG. 8B is a diagram for explaining an example of the averaging circuit when the reference time is set at 10 t in the general-purpose parallel input.

Next, an averaging circuit will be described in which the reference time is set at 10 t with reference to FIG. 8B. FIG. 8B is a diagram for explaining an example of the averaging circuit when the reference time is set at 10 t in the general-purpose parallel input.

As illustrated in FIG. 8B, the phase synchronization apparatus 200 has a shift register in which 8 data can be located from reference time 10 t at the center toward both ends and a circuit for summing up 17 processing data, for example. Among successive processing data input to the shift register, the phase synchronization section 200 obtains 17 processing data corresponding to the number of data to be averaged from the center or reference time 10 t toward both ends in the shift register.

Then, the phase synchronization apparatus 200 sums up the obtained 17 processing data and outputs the result. The processing time period taken for summing up the processing data is 7 t.

Figure 8C:
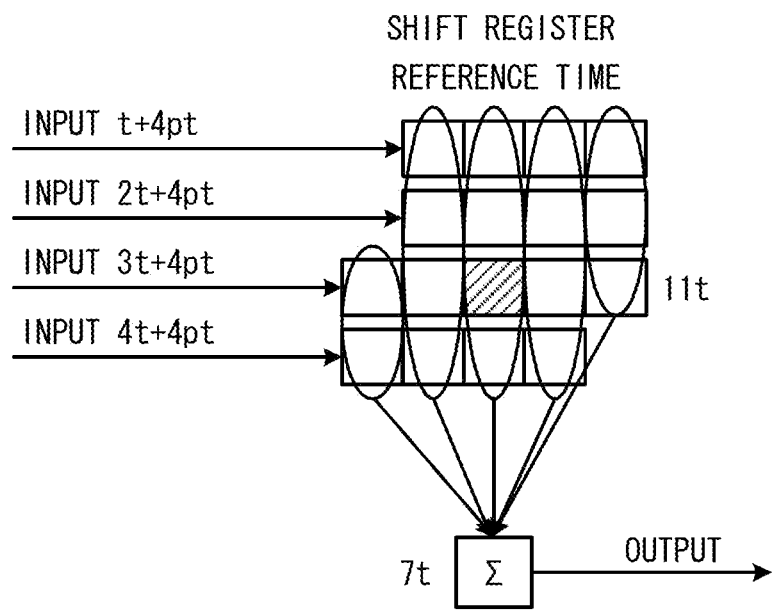
FIG. 8C is a diagram for explaining an example of the averaging circuit when the reference time is set at 11 t in the general-purpose parallel input.

Next, an averaging circuit will be described in which the reference time is set at 11 t with reference to FIG. 8C. FIG. 8C is a diagram for explaining an example of the averaging circuit when the reference time is set at 11 t in the general-purpose parallel input.

As illustrated in FIG. 8C, the phase synchronization apparatus 200 has a shift register in which 8 data can be located from reference time 11 t at the center toward both ends and a circuit for summing up 17 processing data, for example. Among successive processing data input to the shift register, the phase synchronization apparatus 200 obtains 17 processing data corresponding to the number of data to be averaged from the center or reference time 11 t toward both ends in the shift register.

Then, the phase synchronization apparatus 200 sums up the obtained 17 processing data and outputs the result. The processing time period taken for summing up the processing data is 7 t.

Figure 8D:
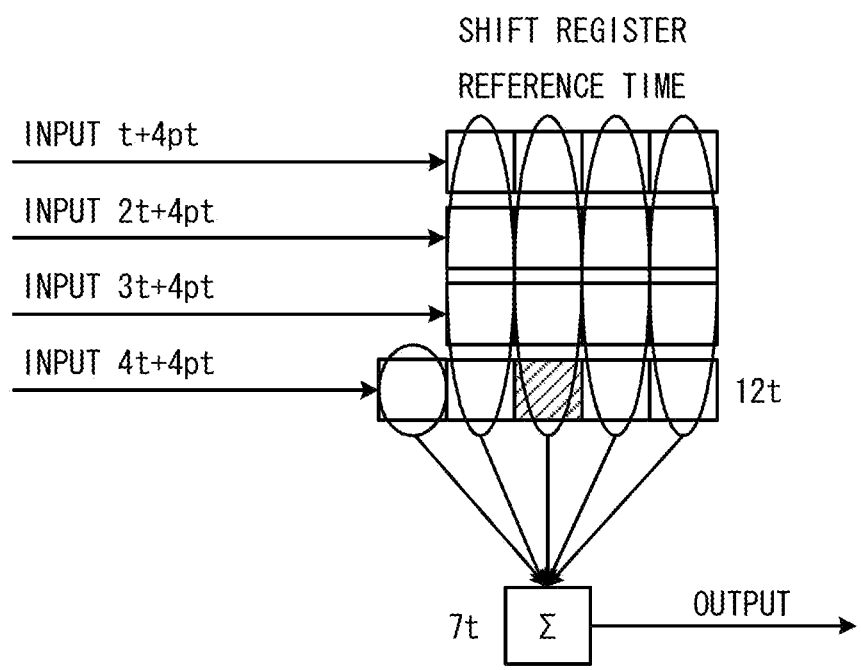
FIG. 8D is a diagram for explaining an example of the averaging circuit when the reference time is set at 12 t in the general-purpose parallel input.

Next, an averaging circuit will be described in which the reference time is set at 12 t with reference to FIG. 8D. FIG. 8D is a diagram for explaining an example of the averaging circuit when the reference time is set at 12 t in the general-purpose parallel input.

As illustrated in FIG. 8D, the phase synchronization apparatus 200 has a shift register in which 8 data can be located from reference time 12 t at the center toward both ends and a circuit for summing up 17 processing data, for example. Among successive processing data input to the shift register, the phase synchronization apparatus 200 obtains 17 processing data corresponding to the number of data to be averaged from the center or reference time 12 t toward both ends in the shift register.

Then, the phase synchronization apparatus 200 sums up the obtained 17 processing data and outputs the result. The processing time period taken for summing up the processing data is 7 t.

Thus, the phase synchronization apparatus 200 which supports the general-purpose parallel input can realize a digital coherent light receiver with higher performance resulting from the improved normal identification possibility in the identification section in the later stage.

Examples of Advantage in Embodiment 1

As described above, since the phase synchronization apparatus obtains as many data as the number of data to be averaged from near the center toward both ends in the shift register which allows the maximum number of data to be averaged, sums up the obtained data, and outputs the result, then it is possible to obtain a variable number of data to be averaged from the shift register and achieve an invariable delay amount.

The phase synchronization apparatus can achieve the invariable delay amount to prevent main signal errors for at least one clock that would occur in changing the delay amount. In other words, the ability to prevent the main signal errors and to change the number of data to be averaged at the same time means that the range of data to be averaged can be changed during the operation of the apparatus. The range of data to be averaged greatly influences the line width of a laser in use and the like. When an inexpensive laser is used for the purpose of cost reduction, the characteristics of the line width are quite likely to change due to surrounding environments and aged deterioration, so that the abovementioned advantage is significant.

Description will hereinafter be made of a structure of an averaging section according to the related art when the number of data to be averaged is variable with reference to FIG. 11A and FIG. 11B. The following description will be made assuming that processing in the biquadratic operation section takes 4 t (t represents a unit time), processing in the argument calculation section takes 5 t, and processing in the ¼ division section takes 6 t.

First, a structure of an averaging section will be described in which the number of data to be averaged is 5 according to the related art with reference to FIG. 11A. FIG. 11A is a diagram for explaining an example of the structure of an averaging section when the number of data to be averaged is 5 according to the related art.

Figure 11A:
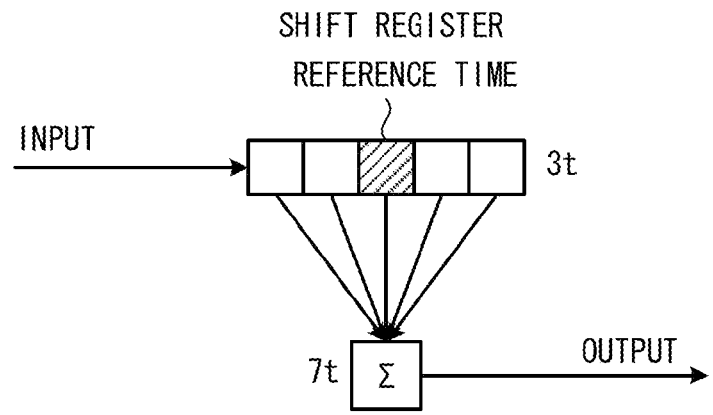
FIG. 11A is a diagram for explaining an example of the structure of an averaging section when the number of data to be averaged is 5 according to the related art.

For example, when the number of data to be averaged is 5 as illustrated in FIG. 11A, data at a point 3 t is referenced which is placed at the center of five data from the left end of a shift register that corresponds to an input side. When a time period of 7 t is needed in the summation processing, the processing time in the averaging section is determined as 3 t+7 t=10 t. As a result, the delay amount added in a delay addition section is determined as 4 t+5 t+6 t+(3 t+7 t)−5 t=20 t.

Next, a structure of an averaging section will be described in which the number of data to be averaged is 3 according to the related art with reference to FIG. 11B. FIG. 11B is a diagram for explaining an example of the structure of an averaging section when the number of data to be averaged is 3 according to the related art.

Figure 11B:
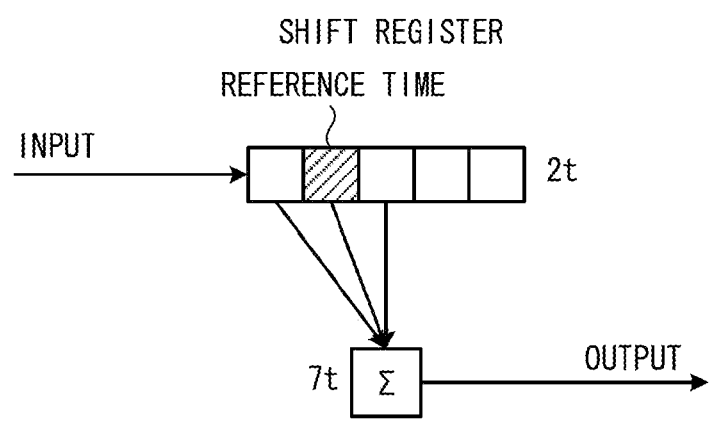
FIG. 11B is a diagram for explaining an example of the structure of an averaging section when the number of data to be averaged is 3 according to the related art.

For example, when the number of data to be averaged is 3 as illustrated in FIG. 11B, data at a point 2 t is referenced which is placed at the center of three data from the left end of a shift register that corresponds to an input side. When a time period of 7 t is needed in the summation processing, the processing time in the averaging section is determined as 2 t+7 t=9 t. As a result, the delay amount added in a delay addition section is determined as 4 t+5 t+6 t+(2 t+7 t)−5 t=19 t.

Figure 11C:
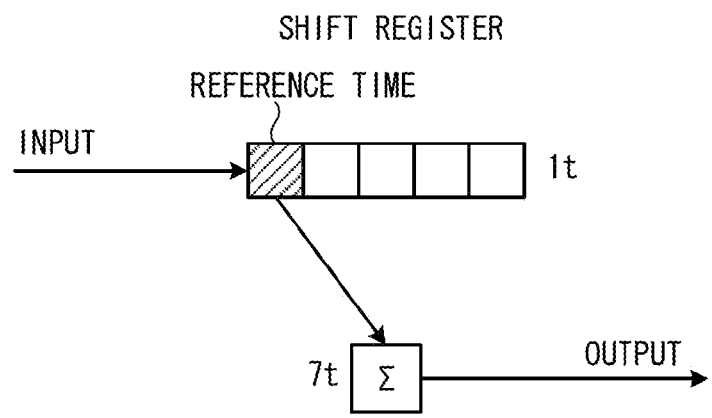
FIG. 11C is a diagram for explaining an example of the structure of an averaging section when the number of data to be averaged is 1 according to the related art.

Next, a structure of an averaging section will be described in which the number of data to be averaged is 1 according to the related art with reference to FIG. 11C. FIG. 11C is a diagram for explaining an example of the structure of an averaging section when the number of data to be averaged is 1 according to the related art.

For example, when the number of data to be averaged is 1 as illustrated in FIG. 11C, data at a point 1 t is referenced which is placed at the first from the left end of a shift register that corresponds to an input side. When a time period of 7 t is needed in the summation processing, the processing time in the averaging section is determined as 1 t+7 t=8 t. As a result, the delay amount added in a delay addition section is determined as 4 t+5 t+6 t+(1 t+7 t)−5 t=18 t.

Embodiment 2

While description has been made of the embodiment of the phase synchronization apparatus and the digital coherent light receiver, the embodiment may be implemented in various different forms. Then, different embodiments will be described in (1) the averaging circuit and (2) the structure of the phase synchronization apparatus.

(1) Averaging Circuit

While Embodiment 1 has been described in conjunction with the shift register which allows the maximum number of data to be averaged and the phase synchronization apparatus which obtains as many processing data as the number of data to be averaged from near the center toward both ends in the shift register, the averaging circuit as the averaging section 120 or the averaging section 220 can be used in various apparatuses.

For example, the averaging circuit includes a shift register successively receiving, as its input, data from an arbitrary external apparatus and supporting the maximum number of data to be averaged, and among the successive data input to the shift register, obtains as many data as the number of data to be averaged from near the center toward both ends in the shifter register, sums up the obtained data, and outputs the result.

(2) Structure of Phase Synchronization Apparatus

It is possible to change arbitrarily the processing procedure, the control procedure, the specific names, and the information including various data and parameters (for example, the specific name of the delay addition section 150) illustrated in this document and the drawings, unless otherwise specified.

The components of the illustrated apparatuses are conceptual and do not necessarily require the exact physical structures illustrated in the drawings. In other words, the specific forms of the distribution and integration of the apparatuses are not limited to those illustrated. For example, all or some of the apparatuses can be distributed or integrated functionally or physically in arbitrary units depending on various burdens or use conditions such as distribution of the ¼ division section 130 to individual housings as a ¼ division section and an argument calculation section. In addition, all or arbitrary portions of the respective processing functions performed in the apparatuses may be realized by a CPU or a program analyzed and executed by the CPU, or may be realized as hardware with wired logic.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A phase synchronization apparatus comprising:
a removal path for removing an error component contained in an input signal, the removal path including an averaging section; and
a delay addition path for adding a delay corresponding to a processing time period taken to remove the error component in the removal path, wherein
the averaging section includes:
a shift register storing as many data as the maximum number of data to be averaged and successively receiving processing data from which the error component has been extracted in the removal path; and
an obtaining unit for obtaining, among the successive processing data input to the shift register, as many processing data as the number of data to be averaged from a position near the center toward both ends in the shift register.

2. The phase synchronization apparatus according to claim 1, wherein the obtaining unit uses a position at the center in the shift register as the position near the center when the maximum number of data to be averaged is an odd number.

3. The phase synchronization apparatus according to claim 1, wherein the obtaining unit uses, as the position near the center, one of a forward position and a backward position out of positions near the center in the shift register when the maximum number of data to be averaged is an even number.

4. The phase synchronization apparatus according to claim 1, wherein the obtaining unit obtains as many processing data as the number of data to be averaged uniformly from the position near the center toward both ends in the shift register when the maximum number of data to be averaged is an odd number.

5. The phase synchronization apparatus according to claim 1, wherein the obtaining unit obtains as many processing data as the number of data to be averaged such that the number of one of forward and backward processing data is larger by one from the position near the center toward both ends in the shift register when the maximum number of data to be averaged is an even number.

6. The phase synchronization apparatus according to claim 3, wherein, when the maximum number of data to be averaged is an even number, the obtaining unit obtains as many processing data as the number of data to be averaged such that the number of backward processing data is larger by one when the forward position is used as the position near the center, and obtains as many processing data as the number of data to be averaged such that the number of forward processing data is larger by one when the backward position is used as the position near the center.

7. The phase synchronization apparatus according to claim 1, wherein, the averaging section further includes a summation operating unit for summing the processing data obtained by the obtaining unit.

8. The phase synchronization apparatus according to claim 1, wherein the processing data input to the shift register is a serial input signal.

9. The phase synchronization apparatus according to claim 1, wherein the processing data input to the shift register is a parallel input signal.

10. A digital coherent light receiver comprising:
a phase synchronization apparatus including:
a removal path for removing an error component contained in an input signal and including an averaging section; and
a delay addition path for adding a delay corresponding to a processing time period taken to remove the error component in the removal path, wherein
the averaging section includes:
a shift register storing as many data as the maximum number of data to be averaged and successively receiving processing data from which the error component has been extracted in the removal path; and
an obtaining unit for obtaining, among the successive processing data input to the shift register, as many processing data as the number of data to be averaged from a position near the center toward both ends in the shift register.

11. A method of phase synchronization, comprising:
taking a processing time period to remove an error component contained in an input signal;
adding a delay corresponding to the processing time period;
storing as many data as a maximum number of data to be averaged in a shift register;
successively receiving processing data from which the error component has been extracted in the shift register;
obtaining, among the successive processing data input to the shift register, as many processing data as the number of data to be averaged from a position near the center toward both ends in the shift register; and
removing the error component.

* * * * *